United States Patent [19]

Kato

[11] Patent Number: 5,258,835
[45] Date of Patent: Nov. 2, 1993

[54] METHOD OF QUANTIZING, CODING AND TRANSMITTING A DIGITAL VIDEO SIGNAL

[75] Inventor: Shiro Kato, Hirakata, Japan
[73] Assignee: Matsushita Electric Industrial Co., Ltd., Osaka, Japan
[21] Appl. No.: 728,242
[22] Filed: Jul. 10, 1991

[30] Foreign Application Priority Data

Jul. 13, 1990 [JP] Japan .................................. 2-186548

[51] Int. Cl.⁵ ............................................ H04N 7/13
[52] U.S. Cl. ..................... 358/135; 358/136
[58] Field of Search ........................ 358/133, 136, 135

[56] References Cited

U.S. PATENT DOCUMENTS 4,703,352 10/1987 Kondo .
5,021,879 6/1991 Vogel ............................... 358/136 X

FOREIGN PATENT DOCUMENTS 3511660 10/1986 Fed. Rep. of Germany .
61-144989 7/1986 Japan .
0151090 7/1987 Japan .
0095790 4/1988 Japan .
0112283 5/1991 Japan .

OTHER PUBLICATIONS

"Adaptive Dynamic Range Coding", A Bit Rate Reduction Method of Television Signals, Tetsujiro KONDO, Sony Corporation, pp. 23-30.
"Still Picture Compression Algorithms Evaluated for International Standardisation", Alain Leger, et al., 1988, IEEE, pp. 1028-1032.

Primary Examiner—Victor R. Kostak
Attorney, Agent, or Firm—Wenderoth, Lind & Ponack

[57] ABSTRACT

A method of coding a digital video signal is characterized by forming a block by grouping together a specific number of pixels from an input digital video signal, setting a quantizing level consisting of a number of levels less than a number of levels determined by a data word length of pixel in every block, quantizing, coding and transmitting the plural pieces of pixel data in each block, and transmitting by coding by combining together at least two pieces of side information necessary for determining the quantizing level in each block.

5 Claims, 2 Drawing Sheets

METHOD OF QUANTIZING, CODING AND TRANSMITTING A DIGITAL VIDEO SIGNAL

BACKGROUND OF THE INVENTION

1. Field of the Invention

The present invention relates to an efficient method of coding a video image capable of decreasing the quantity of information per pixel of digital video signals.

2. Description of the Prior Art

Various methods of coding video signals of this sort have been known hitherto, including, for example, the high efficiency technique for coding a digital video signal disclosed in U.S. Pat. No. 4,703,352, and the block separated component progressive coding reported by Alain Leger et al. in "Still Picture Compression Algorithms Evaluated for International Standardization," CH2535-3/88/0000-1028 1988 IEEE. The former method is explained below.

In the first place, a block is formed by grouping together a specific quantity of pixel data of input digital video signals (for example, one block consists of 16 pieces of pixel data within a rectangular region obtained by dividing a screen in every 4 pixels in the horizontal direction, and every 4 pixels in the vertical direction). Detecting the maximum value MAX and the minimum value MIN in the pixel data (the data expressing the gray scale) within a block, the dynamic range DR (the difference between the maximum value and the minimum value) of every block is determined, and the pixel data within a block is respectively quantized and coded by using the quantizing level provided within the dynamic range (a range from the minimum value to the maximum value).

The pixel data within a block strongly correlate with each other, and the mutual difference is often a small value. Therefore, the dynamic range in the block is smaller than the dynamic range determined by the word length of the video data (the video signal is generally quantized in 8 bits, and its dynamic range is the difference between the maximum quantizing level of 255 and the minimum quantizing level of 0, i.e. 255), and by setting the quantizing level only in the dynamic range, the number of bits to be quantized in the pixel data can be reduced. Furthermore, in a block having a wide dynamic range such as an edge portion of a picture, deterioration is not obvious even if quantized coarsely, and hence the number of bits to be quantized may be further decreased. On the basis of this principle, an efficient coding is realized in this method.

The quantizing level when quantizing within the dynamic range in n bits is the median value of a range of, for example, dividing the dynamic range equally into $2^n$ pieces. Since the quantizing level is created from the maximum value and the minimum value, transmitting of any two of the maximum value, minimum value, and dynamic range as side information in every block allows the same quantizing level setting to be reproduced at the decoding side, so that decoding is possible. When the number of bits n is constant, the pixel data is quantized in the quantizing step size proportional to the dynamic range.

In transmitting two pieces of side information per block and quantized data of n bits per pixel, supposing the number of bits of input video data to be 8, the number of quantized bits n to be 3, and the number of pixels in a block to be 16, since the maximum value, minimum value and dynamic range can output in each block is $$8+8+3\times16=64 \text{ bits.}$$

By contrast, the total number of bits of the input in every block is $$8\times16=128 \text{ bits.}$$

Therefore the video data quantity is compressed to ½.

The problem is, however, that further enhancement of coding efficiency is being demanded.

SUMMARY OF THE INVENTION

It is hence a primary object of the invention to improve the coding efficiency.

To achieve this object, the invention presents a method of coding a digital video signal which comprises a first step of forming a block by grouping together a specific quantity of pixel data of an input digital video signal, a second step of setting a quantizing level consisting of a number of levels smaller than a number of gray scale levels determined by a word length of a pixel data in each block, quantizing the plural pixel data in the block at respective quantizing levels, and coding and transmitting the quantized data, and a third step of transmitting side information necessary for setting the quantizing levels, wherein the third step is characterized by coding together at least two pieces of the side information.

In this constitution, since at least two pieces of the side information are coded and transmitted together, nonexistent combinations out of the side information combinations may be excluded, and the codes may be assigned only to the existent combinations. Therefore, the quantity of bits of the side information may be reduced, so that the coding efficiency can be enhanced.

DESCRIPTION OF THE PREFERRED EMBODIMENT

Figure 1:
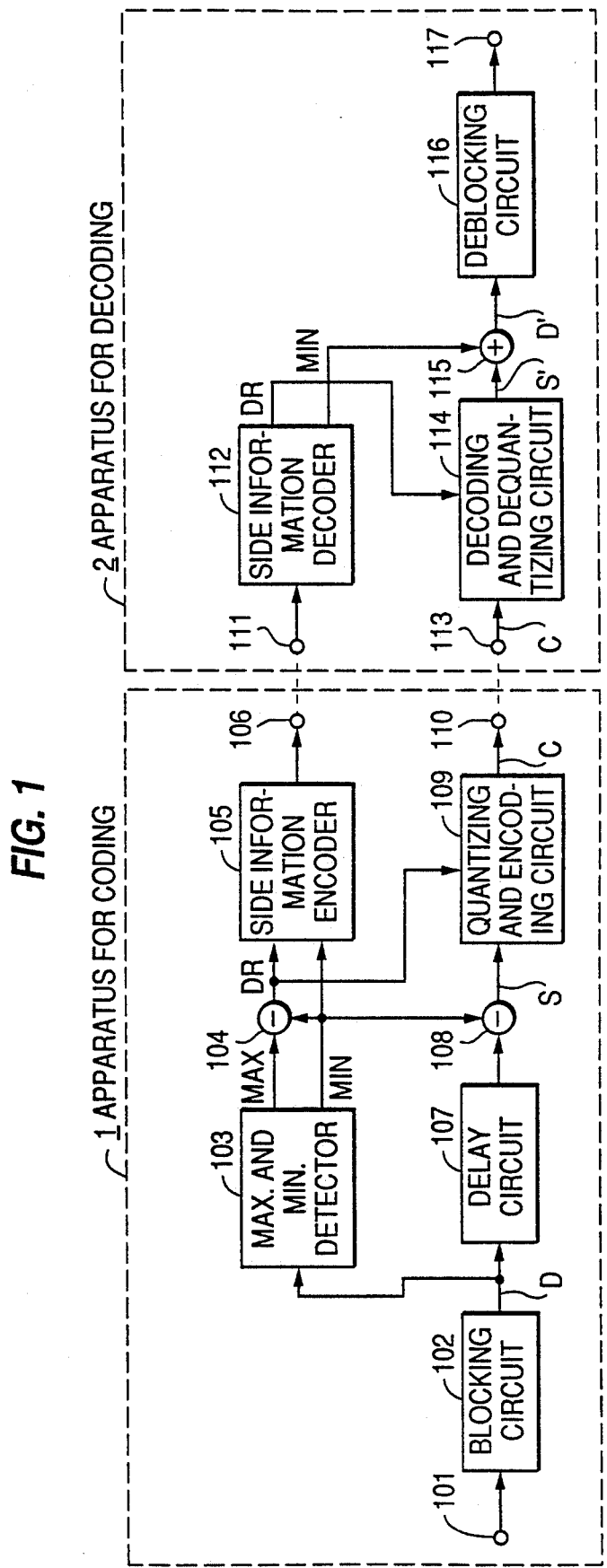
FIG. 1 is a block diagram showing a coding apparatus and a decoding apparatus in an embodiment of the invention.

FIG. 1 is a block diagram showing a coding apparatus and a decoding apparatus in an embodiment performing a method of coding a digital video signal of the invention.

In FIG. 1, numeral 1 is a coding apparatus. Numeral 101 is an input terminal of a digital video signal (data word length is 8 bits), 102 is a blocking circuit for rearranging the pixel data of the digital video signal for delivering pixel data D in every block, 103 is a max. and min. detector for delivering a maximum value MAX and a minimum value MIN of pixel data D in a block, 104 is a subtractor for delivering a dynamic range DR, 105 is a side information encoder circuit for receiving and encoding two pieces of side information, i.e. the minimum value MIN and dynamic range DR, and delivering side information code, 106 is an output terminal of the side information code, 107 is a delay circuit for timing adjustment, 108 is a subtractor for subtracting the minimum value MIN from the pixel data D to obtain pixel data S, 109 is a quantizing and encoding circuit for quantizing the pixel data S and encoding the quantized data to obtain coded data C, and 110 is an output terminal of the coded data C.

In FIG. 1, numeral 2 is a decoding apparatus. Numeral 111 is an input terminal of the side information code, 112 is a side information decoder for receiving and decoding the side information code to obtain the minimum value MIN and dynamic range DR, 113 is an input terminal of the coded data C, 114 is a decoding and dequantizing circuit for reverse processing of the quantizing and encoding circuit 109, that is, decoding the input coded data C, and dequantizing the decoded data to the quantizing level to deliver pixel data S', 115 is an adder for adding the decoded minimum value MIN to the regenerated pixel data S' to regenerate pixel data D', 116 is a deblocking circuit for reverse processing of the blocking circuit 106, that is, putting back the pixel data D' arranged in each block into the original sequence, and delivering a digital video signal, and 117 is an output terminal of the decoded digital video signal.

The operation of thus composed coding and decoding apparatuses is described below.

In the coding apparatus 1, the digital video signal from the terminal 101 is fed into the blocking circuit 102. The blocking circuit 102 forms a block composed of a specific number of pixels, and delivers the pixel data D in every block.

The max. and min. detector 103 detects and delivers a maximum value MAX and a minimum value MIN of pixel data in each block. The subtractor 104 subtracts the minimum value MIN from the maximum value MAX to obtain a dynamic range DR.

In the prior art, the dynamic range and the minimum value were directly delivered as side information (total 16 bits), but in the constitution of present invention, two pieces of side information, that is, the dynamic range DR and the minimum value MIN are coded together in the side information encoder 105 to obtain a side information code (word length 15 bits), which is outputted from the terminal 106. That is, one code is assigned to the combination of two pieces of side information (MIN, DR) for encoding.

The pixel data D of every block is passed through the delay circuit 107 for adjusting the timing and enters the subtractor 108.

The pixel data D is not directly quantized by the quantizer having the quantizing levels provided only in the range of the maximum value MAX and the minimum value MIN, but is instead quantized in two steps as follows to facilitate quantizing. In the first place, the pixel data D is put into the subtractor 108 in which the minimum value MIN is subtracted to produce a pixel data S. The pixel data S is then put into the quantizing and encoding circuit 109 to be quantized into n bits in the quantizing step size proportional to the dynamic range DR in every block, and is coded to be a coded data C, which is outputted from the terminal 110.

Figure 2:
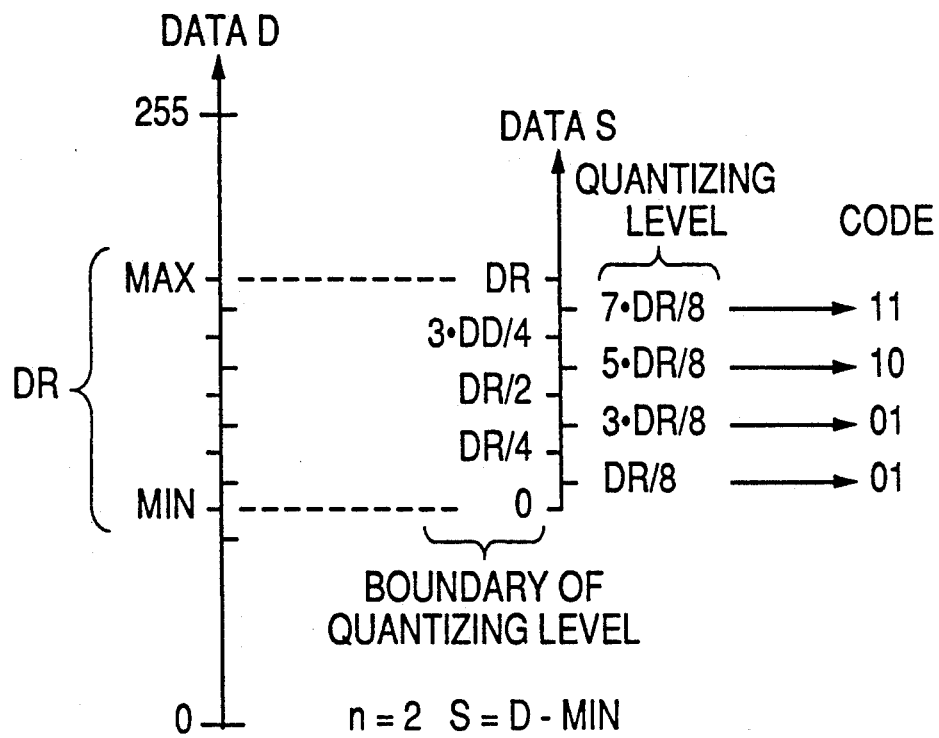
FIG. 2 is a diagram for explaining the quantizing characteristics.

FIG. 2 shows the quantizing characteristic in the case of n=2. Since the minimum value MIN and maximum value MAX of the pixel data S are respectively 0 and DR, the quantizing level of the quantizing and encoding circuit 109 is the median value of the region dividing the range from 0 to DR equally into divisions of the n-th power of 2. Therefore, the pixel data D is quantized indirectly at the quantizing level provided at equal intervals between the minimum value MIN and maximum value MAX. The quantizing and encoding circuit 109 is the same as in the conventional constitution, and it may be composed of one ROM only.

The operation of the decoding apparatus 2 is explained below.

In FIG. 1, the side information code entering from the terminal 111 is decoded by the side information decoder 112 to become two pieces of side information, i.e. the dynamic range DR and the minimum value MIN.

The subsequent processing is the same as in the conventional decoding apparatus for adaptive dynamic range coding. That is, the coded data C entering from the terminal 113 is fed into the decoding and dequantizing circuit 114. In the decoding and dequantizing circuit 114, the coded data C is decoded, and is dequantized in the quantizing step size proportional to the dynamic range, thereby becoming pixel data S'. The pixel data S' is combined with the minimum value MIN in the adder 115 to become pixel data D'. The pixel data D' is fed into the deblocking circuit 116 to be deblocked, and becomes a digital video signal, which is outputted from the terminal 117. The decoding and dequantizing circuit 114 is composed in the same way as the conventional decoding and dequantizing circuit, and it may be composed of one ROM only.

Next the coding principle of the side information of the invention is explained below by referring to FIG. 3. In the diagram, the axis of ordinates and the axis of abscissas respectively denote the dynamic range DR and minimum value MIN which are side information. The number of possible combinations of two pieces of 8-bit word length data is $256 \times 256 = 65536$, which corresponds to the square region combining the regions a, b of this diagram.

However, the combination actually existing in the combinations of the dynamic range DR and minimum value MIN of the 8-bit word length is the region satisfying all of the following three conditions:

$0 \leq MIN \leq 255$ $0 \leq DR \leq 255$ $0 \leq MIN + DR \leq 255$, that is, region a in the diagram. The number of actually existing combinations is about half the figure of the above combinations, (65536/2+128). It is slightly more than half because the region a includes the combinations on the borderline of regions a, b.

Figure 3:
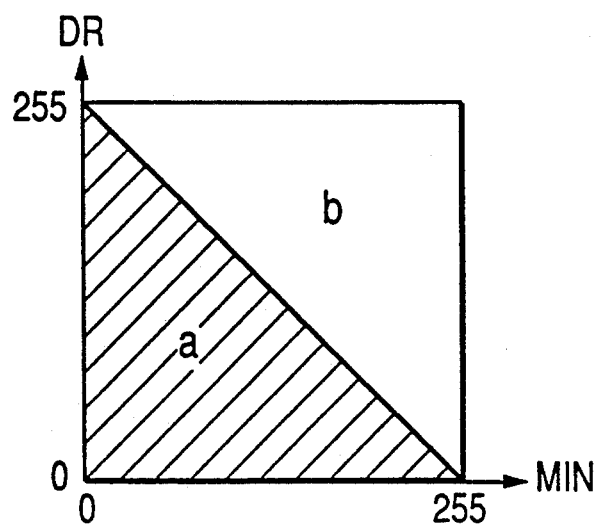
FIG. 3 is a diagram for explaining the coding method of side information in the invention.

Actually, meanwhile, since there are combinations very low in incidence and combinations very small in occurrence of distortion if replaced with the neighboring combinations within the region in FIG. 3, considering them, the existent combinations may be set a half, i.e. 65536/2 or less. For example, the dynamic range of digital video signal is smaller than the dynamic range determined by its data word length (0 to 255), and is in a range of 10 to 220 according to a certain digital video signal standard, and a sufficient margin is given above and beneath the dynamic range. Therefore, in the input, if the video data of quantizing level 0 is clipped at the quantizing level 1, for example, the signal deterioration can be practically ignored. In this embodiment, accordingly, the number of existing combinations is set to less than a half (65536/2-128). (In FIG. 1, however, the clip circuit is not shown.)

Therefore, the output of the side information encoder 105 is sufficient with 15 bits, which is 1 bit less than the conventional method of separately transmitting the two pieces of side information, that is, the dynamic range DR and the minimum value MIN. The side information encoder 105 may be easily realized, for example, by a ROM (read-only memory) of 16-bit input and 15-bit output.

Thus, according to the embodiment, by putting together the two pieces of side information for setting the quantizing level (the dynamic range DR and minimum value MIN) as one combination and encoding, the nonexistent combinations of side information are excluded, and the codes may be assigned only to the existing combinations, and the quantity of the transmission bits may be reduced by one bit, so that the coding efficiency can be enhanced.

The saved 1 bit may be used in various ways. For example, it may be used for transmission of various data, as the information for adapting for combining with the coding method such as adaptive sub-sampling, as the flag for changing over the quantizer further adaptively, for transmission of threshold value for adaptively changing over the number of bits n to be quantized, or as the parity for detection of error.

In the foregoing embodiment, as the side information, the dynamic range DR and minimum value MIN are transmitted. However, since one out of the maximum value MAX, minimum value MIN, and dynamic range DR may be obtained without deterioration from any other two, the invention may be realized when any two are transmitted as side information. Of course, the side information is not particularly limited as far as the maximum value and minimum value of the quantizing levels can be determined automatically, and aside from the above three pieces of information, for example, combinations with the mean value of the maximum value and minimum value, and with the quantizing step size may be considered. Instead of the maximum value and minimum value, of course, the maximum quantizing level and minimum quantizing level may be used.

In the embodiment, the invention is applied to the method of coding for linear quantizing at a uniform interval of quantizing level, but the invention may be also applied to the method of coding for nonlinear quantizing at a nonuniform interval of quantizing level. In the case of nonlinear quantizing, three or more pieces of information may be transmitted as the side information. When transmitting three or more pieces of side information, similarly, by coding two or more pieces of side information together, it is possible to transmit by excluding the actual nonexistent combinations, so that the coding efficiency is evidently improved.

Meanwhile, various block compositions may be considered, and this embodiment is not intended to be limitative.

According to the invention, as described herein, by combining and coding together some of the side information for setting the quantizing level, nonexistent side information combinations can be excluded, and the quantity of the transmission bits of side information may be saved, and the coding efficiency can be enhanced, and its practical value is substantial.

What is claimed is:

1. A method of coding a digital video signal comprising:
   a first step of forming a block by grouping together a specific quantity of video data of an input digital video signal,
   a second step of setting a quantizing level consisting of a number of levels smaller than a number of levels determined by a word length of pixel data in each block, quantizing the plural pixel data in a block at the respective quantizing levels, and coding and transmitting the quantized data, and
   a third step of transmitting side information necessary for setting the quantizing level,
   wherein the third step is characterized by coding together at least two pieces of the side information, and
   wherein the side information to be transmitted in the third step includes any two of a maximum quantizing level, a minimum quantizing level, and a difference between the maximum quantizing level and minimum quantizing level.

2. A method of coding and transmitting a digital video signal comprising:
   a first step of forming a block by grouping together a digital video signal comprising:
   a first step of forming a block by grouping together a specific quantity of pixel data of an input digital video signal;
   a second step of setting quantizing levels consisting of a number of levels smaller than a number of levels determined by a word length of a pixel data in said block, quantizing said specific quantity of pixel data in said block at the respective quantizing levels to obtain quantized pixel data, and coding said quantized pixel data to obtain coded pixel data;
   a third step of coding a combination of at least two side information necessary for setting said quantizing levels in said block to obtain a single side information code; and
   a fourth step of transmitting said coded pixel data and said single side information code.

3. A method according to claim 2, wherein said at least two side information includes any two of a maximum value, a minimum value and a difference between the maximum value and minimum value of the pixel data within said block.

4. A method according to claim 2, wherein said at least two side information includes any two of a maximum quantizing level, a minimum quantizing level and a difference between the maximum quantizing level and minimum quantizing level.

5. A method according to claim 2, wherein said at least two side information includes any two pieces of information for determining a maximum quantizing level and a minimum quantizing level.

* * * * *